United States Patent Office 3,234,907
Patented Feb. 15, 1966

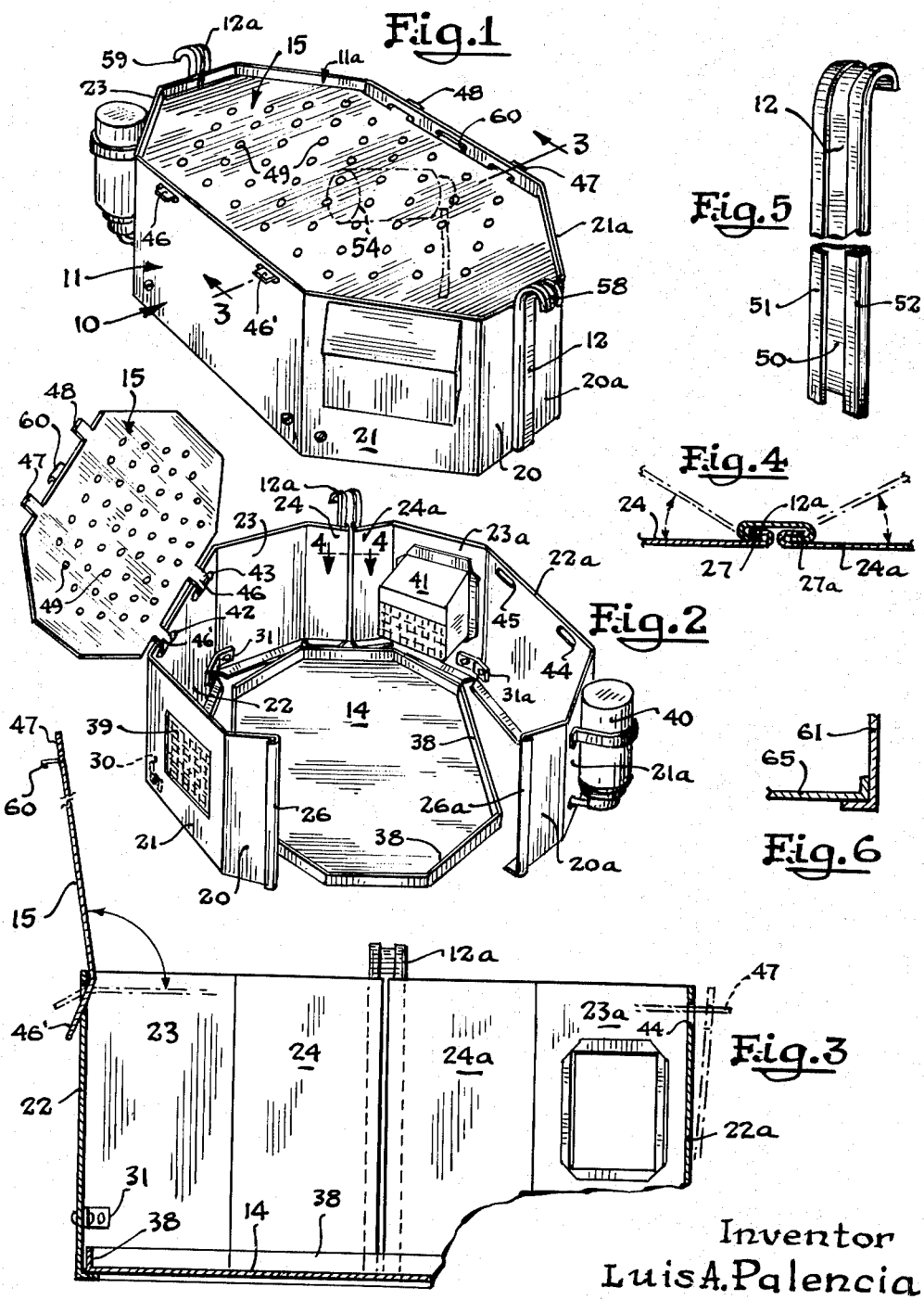

3,234,907
KNOCK DOWN ANIMAL CAGE
Luis A. Palencia, Apartado 25247, C.V. 20,
Mexico City, Mexico
Filed Sept. 27, 1963, Ser. No. 312,093
3 Claims. (Cl. 119—17)

The present invention relates generally to animal cages and more particularly to an improved cage for laboratory experimental animals which is better adapted to maintain the animals in a clean environment and substantially free of extraneous contamination.

In order for pharmaceutical and medical research scientists to accurately screen and study the pharmacological and therapeutic properties of new drugs and perform other controlled investigations a great many laboratory animals, such as mice, rats and hamsters, are kept for experimental purposes by research laboratories. It is extremely important that these experimental animals be kept in a clean environment and free of extraneous contamination so that the results observed in the test animals is entirely the product of the administered drug or inoculation and not due to some outside infection. Consequently, great care is exercised to have the cages in which the experimental animals are placed completely sterile and to keep the cages clean and free of contamination for the duration of the investigation.

Heretofore, animal cages, particularly the type used for small animals such as mice, rats and hamsters, have generally been comprised of box-like structure which have required considerable manual handling and/or complex mechanical apparatus to effectively clean and sterilize or maintain clean during the time the animals are held therein.

It is therefore an object of the present invention to provide an improved animal cage formed of interchangeable parts which can be readily assembled and disassembled to effect cleaning and sterilization of the cage or for replacement or cleaning of any part thereof.

It is a further object of the present invention to provide an improved animal cage and cage parts which are readily cleaned and sterilized by hand or by conventional cleaning apparatus.

It is also an object of the present invention to provide an improved animal cage which after cleaning and sterilization can be more easily maintained clean and sterile and/or stored in a minimal space.

Other objects of the present invention will be apparent from the following detailed description, claims, and accompanying drawing wherein:

FIG. 1 is a perspective view of an animal cage embodying the present invention;

FIG. 2 is a perspective view of the animal cage of FIG. 1 in one position of use;

FIG. 3 is a vertical sectional view taken along the line 3—3 of FIG. 1;

FIG. 4 is a fragmentary horizontal sectional view taken along the line 4—4 of FIG. 2;

FIG. 5 is a perspective view of an element of the animal cage of FIGS. 1-4; and

FIG. 6 is a fragmentary vertical sectional view of a modified form of the present invention.

As illustrated in FIGS. 1-3 of the drawing, the body of the animal cage 10 is formed generally of lateral wall sections 11, 11a which are preferably connected at their opposite ends by a removable fastener element, such as the slidable clip fasteners 12, 12a, and which has a lower floor member or litter tray 14 preferably freely supported by the lower portion of the lateral wall sections 11, 11a. A cover member 15 is pivotally and detachably supported by the upper portion of the lateral wall sections 11, 11a.

More particularly, in the form of the invention shown in FIGS. 1-3, each of the lateral wall sections 11, 11a comprises a relatively thin flexible rectangular section of sheet metal, such as aluminum or stainless steel, having a length somewhat greater than the width thereof. The wall sections 11, 11a are preferably bent at spaced points intermediate the ends thereof to form a plurality of rectangular wall panels 20, 21, 22, 23, 24, and 20a, 21a, 22a, 23a and 24a, respectively. The form of the wall sections 11, 11a and the wall panels, of course, are of no patentable significance, and can be in any shape and size that is desired. For example, each of the wall sections 11, 11a can have a semi-circular form or, if more than two wall sections are used, each can have a segmental configuration, if desired.

The opposite ends of the wall sections 11, 11a are provided with frictional engaging means which in the form illustrated in the drawing comprise outwardly reversely bent flanges 26, 27 and 26a, 27a, respectively, forming vertical grooves extending across the ends of the wall sections for receiving the removable fastener element. At least certain of the wall panels of each wall section 11, 11a are preferably provided with connecting brace members 30, 31 and 30a, 31a, respectively, to impart additional strength to the wall sections.

The slidable clip fasteners 12, 12a which hold the ends of the lateral wall sections 11, 11a in substantial contiguous relationship are preferably formed of elongated rectangular strips 50, 55 with inwardly turned locking flanges 51, 52 and 56, 57, respectively. The length and depth of the locking flanges are such as to fit into the oppositely disposed vertical grooves formed by the flanges 26, 26a and 27, 27a, respectively, and resiliently and slidably hold the wall sections 11, 11a in assembled relationship. The upper end of the fasteners 12, 12a extending above the wall panels 11, 11a are preferably turned outwardly and downwardly to provide a gripping section 58, 59 to facilitate engagement and disengagement thereof with respect to the wall sections 11, 11a. At least one and preferably both of the slidable fasteners 12, 12a are designed to form a hinged engagement with the contiguous ends of the wall sections 11, 11a so that when the fastener at one end of the wall sections is removed the opposite ends of the wall sections can be laterally moved with the fastener at the one end serving as a hinge, as best shown in FIGS. 2 and 4 of the drawing.

Each of the wall panels 20–24 and 20a–24a have extending inwardly from the lower edge thereof one or more support elements which in the form illustrated comprise transverse flanges 32, 33, 34, 35, 36, and 32a, 33a, 34a, 35a and 36a, respectively, which together serve as a horizontal support for the floor member 14. At least certain of the wall panel 20–24 and 20a–24a are preferably provided with lateral passages which serve as either a viewing window 39, an inlet for a water bottle 40, or an opening for a feeding trough 41.

The oppositely disposed wall panels 22 and 22a are also preferably provided with openings 42, 43, and 44, 45, respectively, adjacent the upper edge thereof for pivotally engaging and fastening the cover 15 of the cage. A lifting tab 60 is also preferably provided on one edge of the cover 15 to facilitate manipulating thereof.

The floor member or litter tary 14 is preferably formed of a flat section of sheet material having the same general configuration as the perimeter defined by the lower edge of the assembled wall sections 11, 11a, and having exterior dimensions which are substantially the same as or slightly smaller than the interior dimensions of the assembled wall sections 11, 11a so that the support elements on the lower edge of the wall sections maintain the floor member 14 supported between the wall sections 11, 11a, as best shown in FIG. 3 of the drawing. The peripheral edge of the floor member 14 is preferably provided with an upturned flange 38 extending around the entire perimeter thereof which serves as a retainer for litter disposed on the floor member 14, and also serves as a barrier for small animals.

The cover 15 of the cage 10 is formed of a perforated sheet material that has the same general shape and size as the floor member 14, without, however, having the peripheral flange formed thereon. The lateral edge of cover 15 which is disposed opposite the wall panel 22 is provided with outwardly extending tab members 45, 46 which are adapted to engage in openings 42, 43, respectively, and serve as pivotal supports or hinges for the cover 15. And, the lateral edge of the cover 15 is disposed opposite the wall panel 22a is provided with outwardly extending locking tabs 47, 48 which are adapted to engage in openings 44, 45, respectively, and hold the cover securely connected with the wall section 11a. The spaced openings 49 formed in the cover serve as ventilation means and also provide passages for one or more additional water bottles 54.

In assembling the several parts of the animal cage 10, preferabely after cleaning and sterilization, the lateral wall sections 11, 11a are placed with the flanges 26, 27 of section 11 opposite and substantially contiguous with flanges 26a, 27a of section 11a with the floor member 14 between the wall sections 11, 11a resting on the flanges 32–36 and 32a–36a of the wall sections 11, 11a. The lower end of the fastener 12 is then inserted over the upper ends of the flanges 26, 26a and moved downwardly thereover into position as shown in FIG. 1 of the drawing. The clip fastener 12a is similarly mounted over the flanges 27, 27a after which the wall sections 11, 11a are securely joined with the floor member 14 supported therebetween.

The cover member 15 is then mounted on the wall sections 11, 11a by inserting the tabs 45, 46 into the openings 42, 43, respectively, to provide a hinged connection. The locking tabs 47, 48 are then inserted into the openings 44, 45, respectively, by flexing the upper portion of the wall panel 22a outwardly, as best shown in FIG. 3, to permit moving the cover 15 into substantially horizontal position with the tabs 47, 48 opposite the openings 44, 45, respectively, and then allowing the wall section 22a to return to its original position.

In use, a particular desirable feature of the animal cage 10 is the ability to replace a contaminated floor member 14 easily and rapidly with a clean sterilized floor member 14 without completely disassembling the cage. Thus, it is possible to replace a soiled floor member 14 by removing only one of the slidable fasteners, such as fastener 12, from the wall sections 11, 11a and moving the free ends of the sections 11, 11a laterally, while the opposite ends of the wall sections remain pivotally held by fastener 12a, a sufficient distance to permit sliding the soiled cage outwardly through the spaced ends of the wall sections 11, 11a. As the soiled floor member 14 is removed it is preferable to simultaneously insert thereover a clean sterile floor member 14 so that the animals jump from the old floor member onto the new floor member without requiring handling of the animals by the attendant. With the new floor member 14 in place and supported by the wall sections 11, 11a, the fastener 12 is moved into securing engagement with the flanges 26, 26a and the cover 15 is moved into closed position, as previously described.

It will also be evident that because the floor member 14 can be readily removed for cleaning and sterilization without significantly disturbing the interengaging parts of the cage assembly, very little time is required and the cost of caring for the animals can be significantly reduced. Also, since it is possible to clean and sterilize the plate-like floor members 14 in an ordinary dishwasher and easily store a reserve supply of sterile floor members 14 which can be used with any assembly of wall sections 11, 11a (which do not require as frequent sterilization as the floor members 14), the difficulties in maintaining the animals in a clean environment and free of extraneous contamination is further reduced. And, with the animal cage of the present invention it is frequently possible to conduct a complete animal study without having to resterilize the wall sections 11, 11a or the cover member 15, although frequent changes of floor members 14 are carried out during the time the animals remain in the cage 10. When desired, however, it is not difficult or time consuming to completely disassemble the animal cage 10 for cleaning and sterilization of the several parts. The disassembled parts which are interchangeable can also be readily cleaned and sterilized by hand or in an ordinary dishwasher or similar apparatus. The disassembled parts can also be stored in a minimum space.

A further advantage of the cage of the present invention is the capability of easily moving the cover 15 into open position to provide full access to the animals without having to completely remove the cover from the lateral wall sections of the cage. In many prior art cages a lid-like cover is used which has to be removed from the lateral wall sections and placed on another supporting surface. In the present cage, however, the cover is simply moved pivotally to open position, as shown in the dotted line of position of FIG. 3, without removing from the wall section 11. Thus, the cover of the applicant's cage is less likely to become contaminated than the cover of other animal cage structures.

In the modified form of the invention shown in FIG. 6, all the parts are the same as in the embodiment shown in FIGS. 1–5, except that both the lateral wall sections, such as at 61, and the floor member 65 are provided with flange members having rounded corner portions rather than sharp angular corners in order to simplify cleaning and sterilization of the wall sections and floor members.

While the several parts of the animal cages shown and described herein have been formed of metal, such as aluminum or stainless steel, it is possible to form the several parts of suitable molded plastic material or other material coated with plastic. If desired, the floor member or other parts can also be made of a completely disposable material.

Others may practice the invention in any of the numerous ways which are suggested to one skilled in the art by this disclosure, and all such practice of invention are considered to be a part hereof which fall within the scope of the appended claims.

I claim:

1. An animal cage comprising in combination; a plurality of substantially vertically disposed lateral wall sections with the opposite ends of each of said wall sections being in juxtaposition with an end of an adjacent wall section and forming at least two pairs of ends in juxtaposition, a slidable clip fastener disposed outwardly of said wall sections in removable slidable engagement with each said pair of ends in juxtaposition and normally holding said wall sections in assembled relationship, one of said slidable clip fasteners forming a hinged connection between one of said pair of ends in juxtaposition, a pair of ends spaced from said hinged connection being movable into laterally spaced relationship when one of said slidable clip fasteners is slidably disengaged from said pair of ends, each of said wall sections having at the lower edge thereof a marginal flange extending inwardly in a plane substantially perpendicular to the vertical plane of each said wall sections and providing a transverse supporting surface for engaging the lower surface of a floor member, and a floor member freely supported between said wall sections by said flanges; whereby said floor member is readily removable from said wall sections when said wall sections are moved into laterally spaced relationship after slidably removing one of said slidable clip fasteners from engagement with said wall sections.

2. An animal cage as in claim 1, wherein one of said wall sections has a cover member removably and pivotally mounted thereon and which is normally disposed in a substantially horizontal position supported by a said wall section and which can be disposed in an upwardly extending position to fully expose the interior of the cage without disengaging said cover from said one wall section.

3. An animal cage comprising in combination; a plurality of substantially vertically disposed lateral wall sections with the opposite ends of each of said wall sections being in juxtaposition with an end of an adjacent wall section and forming at least two pairs of ends in juxtapositon, a removable fastener element disposed outwardly of said wall sections in removable engagement with each of said pairs of ends in juxtaposition and normally holding said wall sections in assembled relationship, one of said fastener elements forming a hinged connection between one of said pair of ends in juxtaposition, a pair of ends spaced from said hinged connection being movable into laterally spaced relationship when one of said fastener elements is disengaged from said pair of ends, each of said wall sections having at the lower edge thereof a marginal flange extending inwardly in a plane substantially perpendicular to the vertical plane of each said wall sections and providing a transverse supporting surface for engaging the lower surface of a floor member, and a floor member freely supported between said wall sections by said flanges; whereby said floor member is readily removable from between said wall sections after removing one of said fastener elements from engagement with said wall sections.

References Cited by the Examiner

UNITED STATES PATENTS

| | | | |
|---|---|---|---|
| 952,355 | 3/1910 | Prescott et al. | 119—19 |
| 1,087,414 | 2/1914 | Welch | 119—19 |
| 1,455,105 | 5/1923 | Butcher | 119—19 |
| 1,581,082 | 4/1926 | Clarke | 119—19 |
| 1,669,300 | 5/1928 | Hunter | 119—19 |

SAMUEL KOREN, *Primary Examiner.*

ALDRICH F. MEDBERY, *Examiner.*